(12) United States Patent
Wang et al.

(10) Patent No.: US 6,972,665 B2
(45) Date of Patent: Dec. 6, 2005

(54) HAPTIC RECONFIGURABLE DASHBOARD SYSTEM

(75) Inventors: David W. Wang, Kitchener (CA); Kevin L. Tuer, Stratford (CA)

(73) Assignee: Handshake VR Inc., Waterloo (CA)

( * ) Notice: Subject to any disclaimer, the term of this patent is extended or adjusted under 35 U.S.C. 154(b) by 0 days.

(21) Appl. No.: 10/481,154

(22) PCT Filed: Jun. 20, 2002

(86) PCT No.: PCT/CA02/00912

§ 371 (c)(1),
(2), (4) Date: Dec. 17, 2003

(87) PCT Pub. No.: WO02/102616

PCT Pub. Date: Dec. 27, 2002

(65) Prior Publication Data

US 2005/0177287 A1 Aug. 11, 2005

(30) Foreign Application Priority Data

Jun. 20, 2001 (CA) .................................. 2350910

(51) Int. Cl.[7] .............................................. B60Q 1/00

(52) U.S. Cl. .................... 340/425.5; 340/461; 345/156

(58) Field of Search ............................ 340/425.5, 461, 340/161.2; 700/83, 44, 45, 17, 84, 85; 701/36; 345/156, 7, 8, 9, 157, 158, 168, 175, 173, 345/161.2

(56) References Cited

U.S. PATENT DOCUMENTS

| | | | | |
|---|---|---|---|---|
| 6,154,201 A | * | 11/2000 | Levin et al. | ................. 345/184 |
| 6,184,868 B1 | | 2/2001 | Rosenberg et al. | |
| 6,636,197 B1 | * | 10/2003 | Goldenberg et al. | ........ 345/156 |
| 6,703,999 B1 | * | 3/2004 | Iwanami et al. | ............ 345/158 |
| 6,769,320 B1 | * | 8/2004 | Bollgohn et al. | .......... 73/866.3 |

FOREIGN PATENT DOCUMENTS

| | | |
|---|---|---|
| DE | 199 07 620 A | 8/2000 |
| DE | 199 20 525 A | 12/2000 |
| EP | 0 796 756 A | 9/1997 |
| EP | 0 940 295 A | 9/1999 |
| EP | 1 075 979 A | 2/2001 |
| GB | 2 316 375 A | 2/1998 |

* cited by examiner

Primary Examiner—Anh V. La

(57) ABSTRACT

A haptic reconfigurable dashboard system for controlling and monitoring vehicle subsystems is disclosed. The haptic dashboard system comprises (a) a computer for controlling the haptic reconfigurable dashboard system, (b) a virtual device panel for displaying a virtual control device or indicator, the virtual control device or indicator corresponding to one of the subsystems to be controlled or monitored, (c) a haptic device for manipulating the virtual control device or indicator displayed on the virtual device panel, and (d) a haptic feedback mechanism for providing a force effect to the haptic device when it manipulates the virtual control device or indicator. According to virtual controls being carried out in the dashboard system, the subsystems can be controlled or monitored through an interface between the dashboard system and the subsystems, and a user can feel a sense of touching or force through the haptic device while controlling or monitoring the vehicle subsystems.

41 Claims, 4 Drawing Sheets

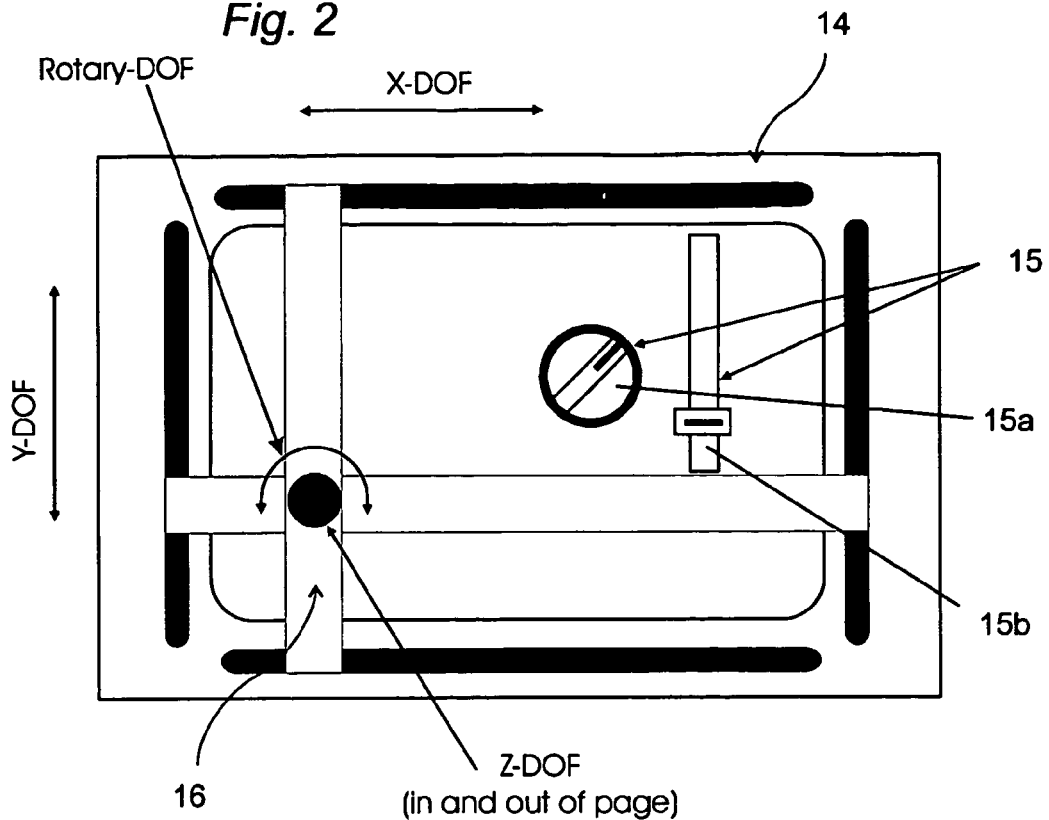
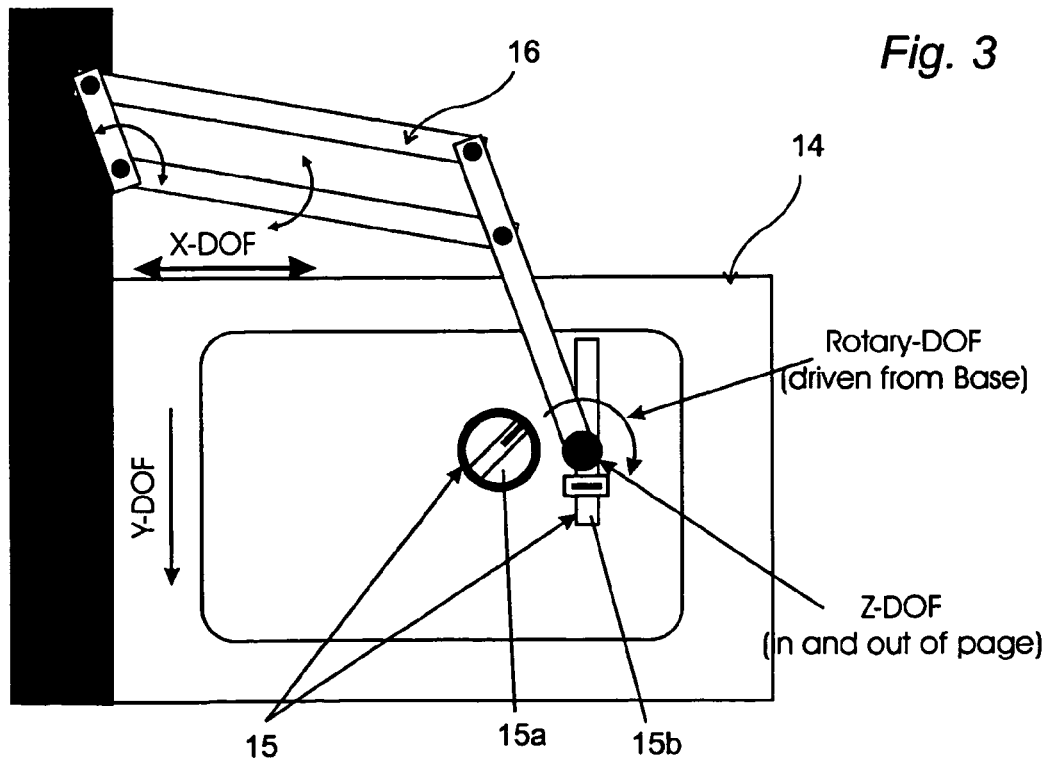

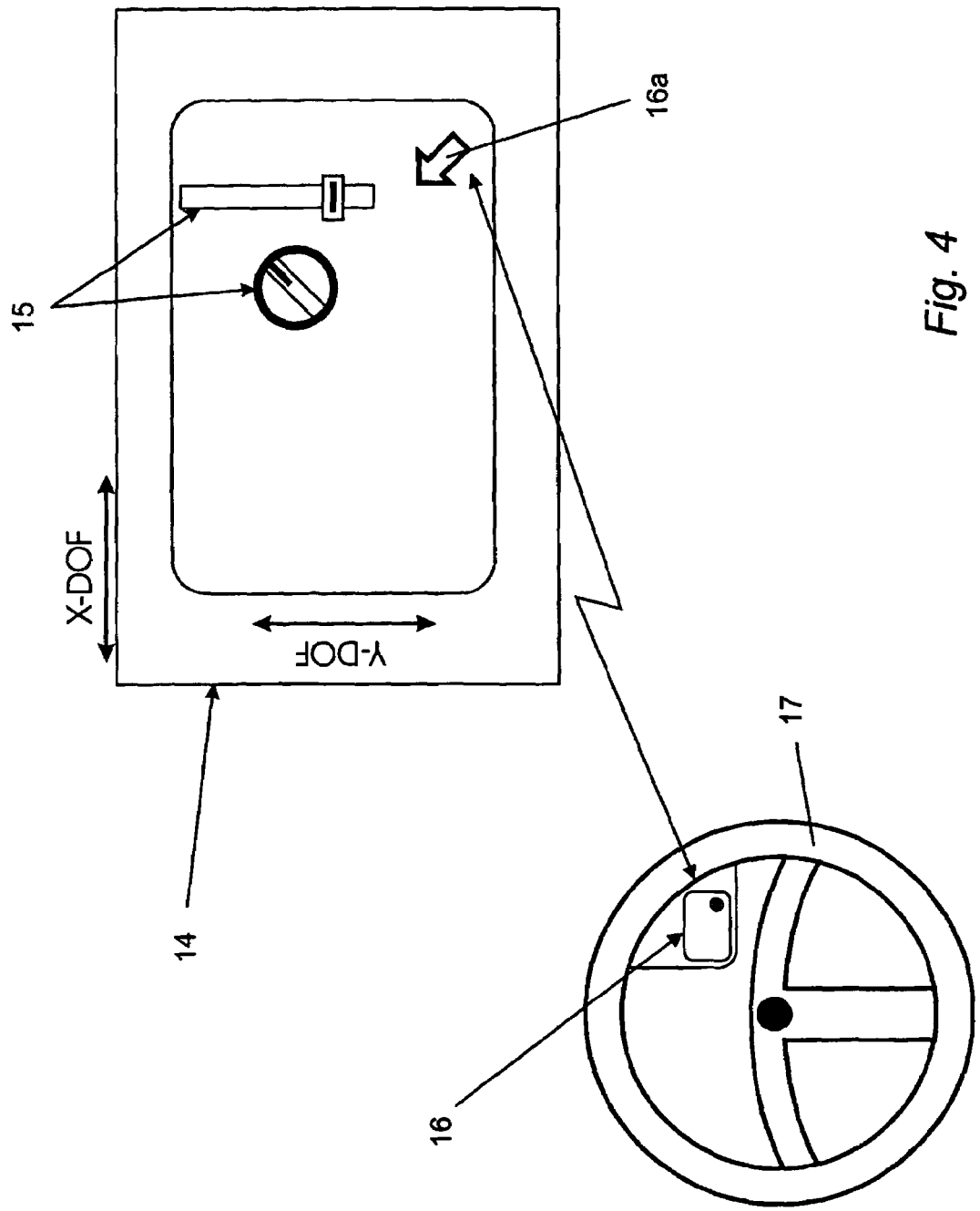

HAPTIC RECONFIGURABLE DASHBOARD SYSTEM

FIELD OF THE INVENTION

The present invention relates to a haptic reconfigurable dashboard system for controlling and monitoring various subsystems and hardware in a vehicle. The invention also relates to a vehicle control system using the haptic reconfigurable dashboard system.

BACKGROUND OF THE INVENTION

The automotive industry is constantly striving to develop new innovations while maintaining or improving safety and reducing cost. One of the recent initiatives involves drive-by-wire technology, where a mechanical device for transmitting forces between two locations is replaced by a series of sensors, actuators, and control software. For example, with the traditional steering system in a vehicle, the driver is able to change the direction of the vehicle by applying force to the steering wheel. The steering wheel is attached to a shaft with a pinion mounted on the end. This pinion subsequently moves a rack that changes the angle of the wheels. Most vehicles have a power assist so that less force is required to be applied by the driver to execute a turn. The mechanical connection transfers the force of the wheel/road interaction back to the steering wheel so that the driver can "feel" the road. In a drive-by-wire vehicle, most of these mechanical linkages are replaced with a variety of sensors, actuators, and control software. To execute a turn in a drive-by-wire system, the driver turns a wheel or moves a joystick in the direction of the desired turn. A sensor measures the amount of rotation or movement of the input device (the wheel or joystick) and, through the control software, commands actuators located at the wheels to turn the wheels by an amount equivalent to the desired turn angle.

A disadvantage of a drive-by-wire approach is that the driver no longer "feels" the road. Accordingly, there is a need to provide a haptic reconfigurable dashboard system, which enables the driver to feel the interaction forces between a control device and a vehicle subsystem or hardware to be controlled, as in a non drive-by-wire vehicle, and which can include all the control buttons and knobs in a vehicle.

SUMMARY OF THE INVENTION

The present invention relates to a haptic reconfigurable dashboard system for vehicles. In the haptic reconfigurable dashboard system of the invention, conventional physical knobs, levers and controls are replaced with virtual knobs, levers, controls and haptic technology in accordance with principles of the present invention.

According to one aspect of the present invention, there is provided a haptic reconfigurable dashboard system. The dashboard system comprises: (a) a computer for controlling the haptic reconfigurable dashboard system; (b) a virtual device panel for displaying a virtual control device or indicator, the virtual control device or indicator corresponding to one of the subsystems to be controlled or monitored; (c) a haptic device for manipulating the virtual control device or indicator displayed on the virtual device panel; and (d) a haptic feedback mechanism for providing a force effect to the haptic device when it manipulates the virtual control device or indicator; wherein, according to virtual controls being carried out in the dashboard system, the plurality of subsystem can be controlled or monitored through an interface between the dashboard system and the subsystems, and wherein a user can feel a sense of touching or force through the haptic device while controlling or monitoring the vehicle subsystems.

According to another aspect of the present invention, there is provided a haptic vehicle control system. The vehicle control system comprises: (a) a computer for supervising the haptic vehicle control system; (b) a haptic reconfigurable dashboard system including (i) a virtual device panel for displaying a virtual control device or indicator, the virtual control device or indicator corresponding to one of automobile hardware to be controlled or monitored, (ii) a haptic device for manipulating the virtual control device or indicator displayed on the virtual device panel, and (iii) a haptic feedback mechanism for providing a force effect to the haptic device when it manipulates the virtual control device or indicator; and (c) a real-time interface between the dashboard system and the automobile hardware, wherein the plurality of automobile hardware can be controlled or monitored through the real-time interface according to virtual controls being carried out in the dashboard system, and wherein a user can feel a sense of touching or force through the haptic device while controlling or monitoring the automobile hardware.

A further understanding of other features, aspects of the present invention and their associated advantages will be realized by reference to the following description, appended claims, and accompanying drawings.

BRIEF DESCRIPTION OF THE DRAWINGS

The embodiments of the invention will now be described with reference to the accompanying drawings, in which:

FIG. 2 shows one embodiment of a haptic device integrated into a virtual device panel;

FIG. 3 shows another embodiment of a haptic device that is external to the virtual device panel;

FIG. 4 shows yet another embodiment of a haptic device that is remote to the virtual device panel.

DETAILED DESCRIPTION OF THE PREFERRED EMBODIMENT(S)

In general, the haptic reconfigurable dashboard system includes a display, a haptic device and a supporting infrastructure. Various virtual controls, the layout of which can be reconfigured by the user when desired, are generated on a display device. The user (driver) uses the haptic device to "feel" these virtual control devices while operating them to control various subsystems within the vehicle such as the radio, environmental control and windshield wipers, or the like, which will be hereinafter referred to as a "vehicle subsystem" or "automobile hardware." Since the dashboard system comprises virtual control devices, the user can configure the layout of the dashboard as desired, or download and implement a pre-configured layout from the manufacturer's website. Through underlying electronic/electrical interfaces, the dashboard system can control a plurality of vehicle subsystems or automobile hardware within the vehicle. Since the dashboard system is controlled via a computer/processor, there exists the opportunity to embed additional intelligence into the operation of each subsystem as well. The concept and principles of the present invention will be described hereafter in greater detail, in conjunction with several preferred embodiments of the invention.

Figure 1:
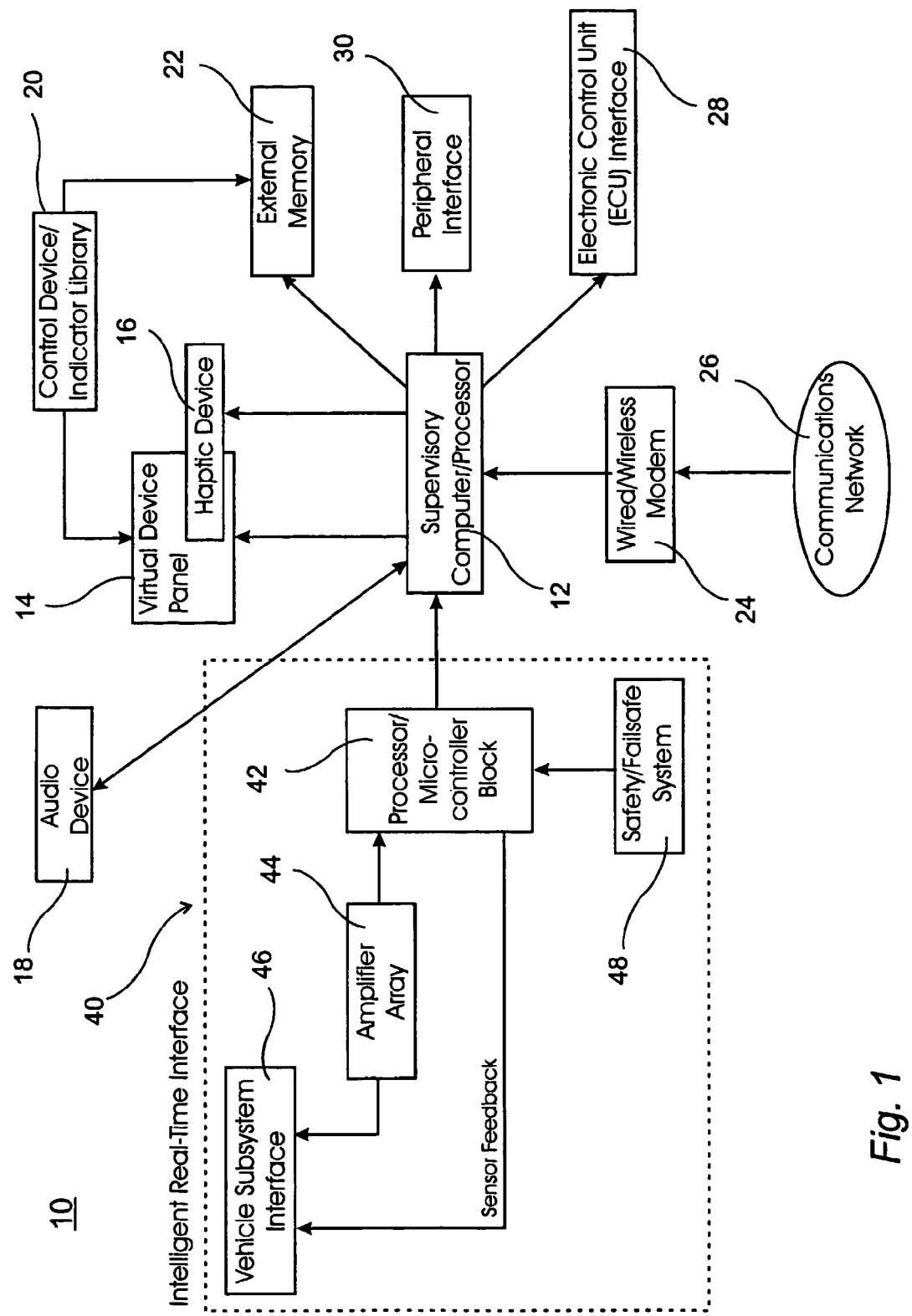
FIG. 1 is a schematic representation of a haptic reconfigurable dashboard system of the invention.

In FIG. 1, there is shown a haptic reconfigurable dashboard system according to one embodiment of the present invention, which is generally denoted by a reference numeral 10 and is hereinafter referred to as a "dashboard system". As shown in FIG. 1, the dashboard system 10 of the invention comprises a supervisory computer/processor 12, a virtual device panel 14, a haptic device 16, an audio device 18, a control device/indicators library 20, an external memory 22, and an intelligent real-time interface 40. The intelligent real time interface 40 comprises a processor/microcontroller block 42, an amplifier array 44, a vehicle subsystem interface 46 and a safety/failsafe system 48. The dashboard system further includes a wired/wireless modem 24, a communications network 26, an electronic control unit (ECU) interface 28, and a peripheral interface 30. Each element of the dashboard system 10 will be detailed below, referring to FIGS. 1 to 5.

As depicted in FIG. 1, the supervisory computer/processor 12 is the heart of the dashboard system of the present invention. It is responsible for controlling the entire dashboard system, for example, controlling the haptic device 16, and the virtual device panel 14, facilitating communications with an ECU via the ECU interface 28, interfacing to other plugs in peripherals via the peripheral interface 30, communicating with the external communications network 26 via the wired/wireless modem 24, driving the audio device 18, accessing the external memory 22, and coordinating the functionality of the intelligent real-time interface 40. The supervisory computer/processor 12 can be a microcontroller or microprocessor, a digital signal processor, an application specific integrated circuit (ASIC) or any other custom designed or off-the-shelf device, which is capable of performing the above tasks.

FIGS. 2 to 4 schematically illustrate several embodiments of the virtual device panel and haptic device. The virtual device panel 14 is used to display various virtual control devices and/or indicators in the vehicle. A user is able to lay out various virtual control devices and indicators on the device panel 14, for example, by using the haptic device 16, which will be hereafter described in greater detail. The user can download a preconfigured layout from a vehicle manufacturer's website or other server via the wired/wireless modem 24 and communications network 26. The virtual device panel 14 allows the user to access the control devices/indicators library 20 that can be provided and periodically updated by a vehicle or automobile maker, for example, through the modem 24. The user is able to select and drag various desired virtual control devices and indicators from the library 20 by using the haptic device 16 onto the virtual device panel 14, where they can be, for example, resized, made a different colour, or the like. Each control device can have a preconfigured range to facilitate the operation of the corresponding device. The virtual device panel 14 may come from the factory with a default dashboard layout, which will likely consist of all possible control devices/indicators or only those that are most commonly used. Using the virtual device panel 14, the user is able to save and load a variety of dashboard layouts to/from the library 20 or restore the default layout. Also, each driver can save and load his or her own dashboard layout preference with a touch of a button or using the haptic device 16.

The virtual device panel 14 can be located on the dashboard system as a separate display or can be implemented as a heads-up system on the windshield, or can be located on the steering wheel. The haptic device 16 can be located remotely from the display in a convenient location readily accessible by the user.

The haptic device 16 allows the user to interface with the virtual control devices/indicators displayed on the virtual device panel 14, set up and/or save a new dashboard layout on the device/indicator library 20, or download a predefined dashboard layout therefrom. The haptic device 16 is adapted to provide the user with the sense of touching as in conventional mechanical controls. That is, when the haptic device overlays a virtual control device on the virtual device panel, a corresponding haptic feedback mechanism is operated to provide the sense of touching to the user. For example, when the user moves the haptic device 16 over the top of a picture of a dial (a virtual control device) on the virtual device panel 14, the operation of the haptic device changes so that the virtual dial feels real. That is, the outside of the dial feels solid and, through the generation of proper forces exerted by the haptic device, the user is able to rotate the dial. In parallel, the image of the dial is updated to show that the dial is being rotated. Similarly, the haptic device can be used to operate sliders, push knobs, rocker switches and other common mechanical devices. In all cases, the objective is to use a multi degree of freedom haptic device to create forces on the user to make the images feel real so as to make the user think they are interfacing to an actual mechanical control device as opposed to an image of a control device. As shown in FIGS. 2 to 4, the haptic device 16 can be integrated into the virtual device panel 14 (FIG. 2), can be external to the virtual device panel (FIG. 3), or can be remote to the virtual device panel (FIG. 4). The preferred embodiment of the haptic device has a minimum of 2½ degrees-of-freedom (DOF) in movement and actuation. As illustrated in FIG. 2, the first degree-of-freedom, defined as the "X-DOF", allows the haptic device 16 to transverse the width of the virtual device panel 14 and to exert force in this direction of movement. The second degree-of-freedom, defined as the "Y-DOF", allows the haptic device 16 to transverse the height of the panel 14 and exert force in this direction of movement. The remaining ½ degree-of-freedom, defined as the "Z-DOF", operates in the direction perpendicular to the plane defined by the X-DOF and the Y-DOF. Haptic feedback in the Z-DOF can be active or passive. Three-dimensional haptic effects can be implemented with as few as two degrees-of-freedom through the appropriate choice of and combination of effects. For example, if effects are programmed to simulate a thin wall in the X-Y plane, the user feels as if the haptic device 16 has gone "over" the wall when passing through this thin wall. This is an effect in the Z direction, even though there are no forces applied by the Z-DOF. The haptic device can incorporate up to six independent degrees-of-freedom (DOF) in movement and actuation—three in translation and three in rotation. A full six DOF haptic device is capable of emulating any touch sensation that can be physically created since the position of any object in three dimensional space can be fully defined by three degrees of freedom in translation and three degrees of freedom in rotation. However, in many cases, fewer degrees of freedom are required. For instance, a virtual dial can be made to feel like a real dial using a device with only three degrees of freedom—two degrees of freedom in translation to make the outside of the dial feel solid and one degree of freedom in rotation to emulate friction or detent effects encountered while rotating the dial.

In FIGS. 2 and 3, a haptic feedback mechanism, for example, actuators or motors, required to generate the force effects in each of the active degrees-of-freedom can be contained within the housing (not shown) of the virtual device panel 14. In FIG. 4, a haptic feedback mechanism, for example, actuators or motors, required to generate the force effects in each of the active degrees-of-freedom can be contained within the housing (not shown) of the haptic device 16. The X-DOF and Y-DOF transverse the plane of the virtual device panel. The Z-DOF acts perpendicular to this plane and may be active or passive. FIGS. 2 and 3 also illustrate one possible implementation of a rotary degree-of-freedom. The actuators to drive this DOF is located either on top of the positioning rails or is contained within the housing of the virtual device panel, giving rise to a remotely driven DOF. FIG. 4 illustrates another embodiment of a rotary degree-of-freedom. The actuator to drive this DOF can be located within the housing of the haptic device 16. There are shown other examples of virtual control devices 15 displayed on the virtual device panel 14—a rotary knob 15a and a slider 15b. Force effects to emulate the feel of a mechanical rotary knob or a slider using the X-DOF, Y-DOF, and/or rotary DOF become active when the Z-DOF portion of the haptic device or the corresponding cursor lies within an effect region of the corresponding virtual control device. For example, in the three DOF case with an integrated or external haptic device, the X-DOF, Y-DOF and the rotary-DOF become active when the Z-DOF lies over top of the virtual rotary knob 15a. As an example, a gravity well effect can be implemented on the X-DOF and Y-DOF to keep the Z-DOF located over the knob 15a. This can be achieved in a variety of ways. In all cases, an effect region can be defined so that the gravity effect will only be active when the haptic device lies within or near the effect region. When inside or near the effect region, the haptic device is driven in such a fashion as to pull the haptic device to the centre of the effect region. The force exerted by the device for a given location within the effect region can be defined by, for example, a gravity model where the force between two objects is proportional to the product of the masses of the two objects and inversely proportional to the square of the distance between the two objects, or a spring effect. In one embodiment, one end of the spring attached to the centre of the region and the other end is attached to the haptic device with the spring acting in tension. Another embodiment utilises a series of springs each with one end attached to the edge of the effect region and the other attached to the haptic device, with each spring acting in compression. The force to be exerted by the haptic device generated by either the gravity or spring models is converted to a voltage or current to drive actuators in the haptic device to generate the gravity effect. In parallel, the Rotary-DOF can be programmed to emulate a series of detents as the knob rotates. In all cases, the strength and type of the force effects can be set by the user.

FIG. 3 illustrates another embodiment of the haptic device according to the invention, which is located external to the virtual device panel 14. In this embodiment, the haptic device 16 is a five bar mechanism with up to three active degrees of freedom (X-DOF, Y-DOF & Rotary DOF) and one active or passive ½ DOF (Z-DOF). The inverse kinematics of the mechanism (the calculation of the required position of each driven degree of freedom so as to achieve a predefined overall device position) are embedded into a supervisory controller dedicated to the haptic device 16 to map from joint axis coordinates (the position of each driven degree of freedom) of the haptic device to Cartesian coordinates of the virtual device panel 14. That is, in order to implement a defined force effect at the end of the haptic device, the relationship between the position of the tip of the haptic device and the position of the driven degrees of freedom must be known a priori. For example, suppose that force effects (in the vertical direction only) are to be added to the slider illustrated in FIG. 3. To achieve this, each driven degree of freedom must be controlled so that force effects are felt as the tip of the haptic device is moved in a vertical direction when the tip of the haptic device is overtop of the slider image. The functionality of the external haptic device and virtual device panel is similar to that of the previous embodiment of FIG. 2.

FIG. 4 illustrates yet another embodiment of the haptic device according to the invention, which is located remotely to the virtual device panel 14. In this embodiment, the haptic device is a thumb-actuated device 16, for example, with up to three active degrees of freedom (X-DOF, Y-DOF & Rotary DOF) and one active or passive ½ DOF (Z-DOF) installed on a steering wheel 17. The operating position of the haptic device corresponds to that of a cursor 16a on the screen of the virtual device panel. The haptic device 16 communicates with the virtual device panel 14 via the supervisory computer/processor. The functionality of the remote haptic device and virtual device panel is similar to that of the previous embodiments of FIGS. 2 and 3.

Furthermore, two haptic devices can be provided at a remote place, for example, can located at approximately 10 o'clock and 2 o'clock positions on the steering wheel 17 of FIG. 4. Two corresponding cursors can also be implemented on the virtual device panel, the position of each one corresponding to the position of each haptic device. Each device has access to specific overlapping or non-overlapping regions of the screen on the virtual device panel. This allows the user, for instance, to control and feel a slider and a rotary knob simultaneously while keeping both hands safely on the wheel 17.

As previously discussed, the control devices/indicator library 20 includes various software representing all possible controls and indicators that are available for a given dashboard system. The user accesses the library 20 by using the haptic device 16 in co-operation with the virtual device panel 14. To configure a dashboard layout, the user selects the desired control/indicator from the library 20 and drags/copies it to the layout screen on the virtual device panel 14. Each control/indicator has associated properties whereby the user can set the type of effects, size, strength of force effects, etc. The library may or may not be resident in the external memory 22. That is, the function of the library 20 can be incorporated into the supervisory computer/processor 12. This library can be updated periodically or when required, for example, using the communications network 26 and the wired/wireless modem 24.

The external memory 22 can be volatile and/or non-volatile. The control devices/indicators library can be located in non-volatile external memory to off load supervisory processor memory.

Figure 5:
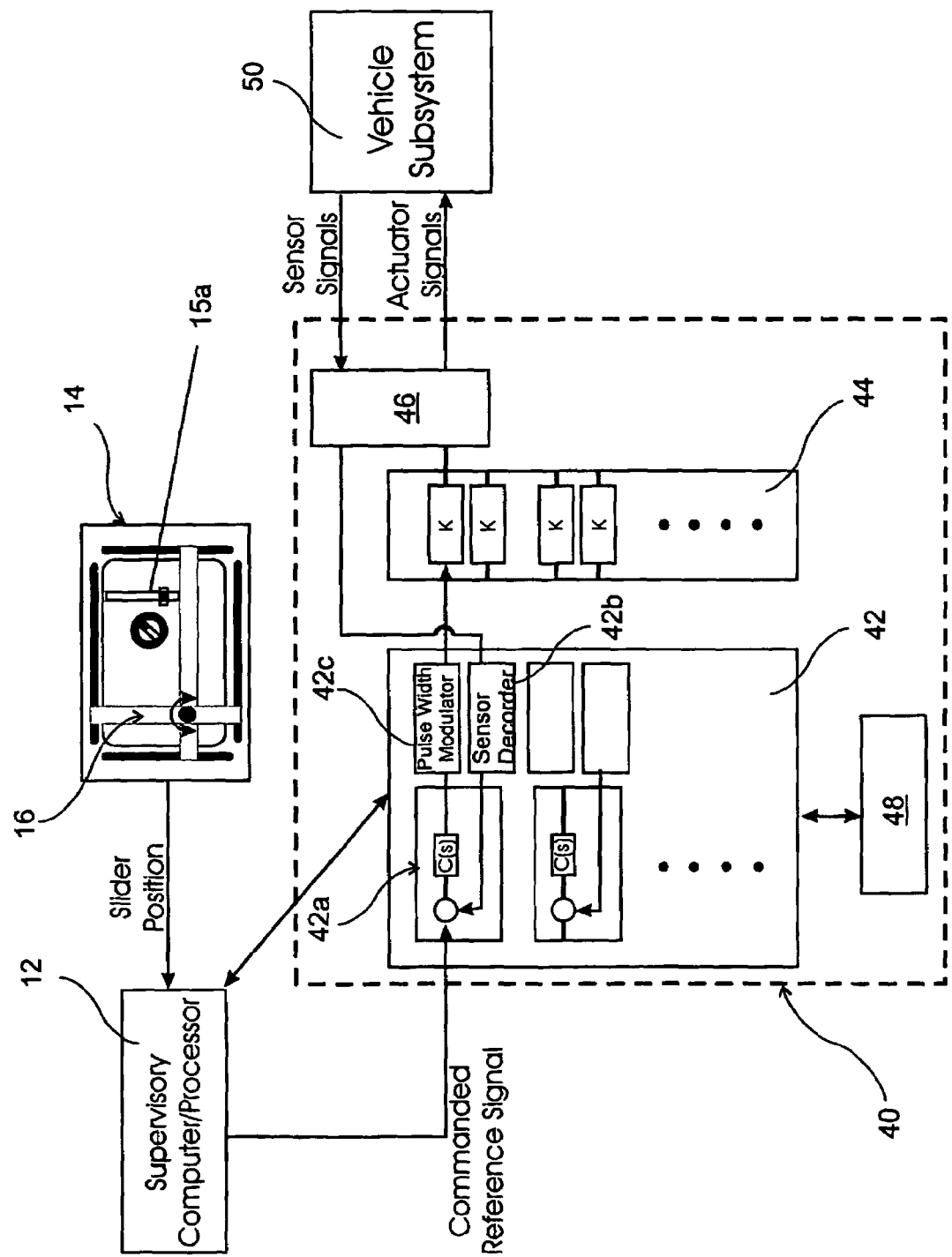
FIG. 5 shows the connectivity of components of the haptic reconfigurable dashboard system, in which the control loop is closed within the processor/microcontroller block of the intelligent real-time interface.

FIG. 5 schematically illustrates the intelligent real-time interface of FIG. 1. As shown in FIG. 5, the intelligent real-time interface 40 includes a processor/microcontroller block 42, an amplifier array 44, a vehicle subsystem interface 46, and a safety/failsafe system 48. The intelligent real-time interface 40 connects the dashboard system 10 to vehicle subsystems 50 via the vehicle subsystem interface 46, which facilitates easy access to various sensors and actuators within the vehicle subsystem. The intelligent real time interface can also access sensors/actuators of a vehicle subsystem through the supervisory processor 12 and the ECU interface 28.

The real-time interface 40 is sufficiently intelligent to interpret the needs of the connected vehicle subsystem or automobile hardware. For instance, the intelligent real-time interface 40 is able to output either analogue or digital (e.g. pulse width modulated (PWM)) signals to drive the amplifiers for the subsystem. Moreover, it is able to read from a variety of sensor types (e.g. analogue, digital.).

The intelligent real-time interface is configured so as to allow easy insertion or replacement of processors/microcontrollers included therein to make it readily adaptable to the specific needs of an application. The intelligent real-time interface also facilitates the download of software/firmware updates through the wired/wireless modem and communications network. For instance, a central server on the Internet can notify (via email, file transfer protocol (ftp), message sent directly to the reconfigurable panel.) users via the modem and supervisory controller/processor that a software/firmware upgrade for relevant devices within the vehicle is available for download. If the user chooses to install the upgrade, the command can be issued via the virtual device panel to download (via file transfer protocol (ftp), message sent directly to the reconfigurable panel, etc.) the upgrade via the modem and supervisory controller/processor and install it on the relevant subsystem via the subsystem interface. Alternatively, the update can be installed via the supervisory controller/processor and the ECU interface. The user can also configure the system so that the upgrades are performed automatically whereby the entire upgrade process is totally transparent to the user.

Referring to FIG. 5, one example of a control loop for a specific subsystem is described below. The user positions the haptic device 16 over the top of the slider 15*b* at which point a gravity effect is enabled thereby keeping the Z-DOF of the haptic device "locked" to the slider 15*b*. As the user moves the haptic device 16 in the Y direction, the virtual slider 15*b* moves and the recorded slider position changes. The slider position is sent to the supervisory computer/processor 12 where it is transformed into a commanded reference signal for use by one of the processors/microcontrollers 42*a* within the processor/microcontroller block 42. In this example, the control loop is closed within the processor/microcontroller using embedded linear or non-linear controller function C(s). Sensor signals from the vehicle subsystem 50 are read into the processor/microcontroller 42*a* through the sensor decoder 42*b* (e.g. quadrature decoder for encoder signals) via the vehicle subsystem interface 46. The difference between the commanded reference signal and the sensor signal is used to derive an error signal. The controller function C(s) processes the error signal in accordance with a pre-set control law to generate an appropriate correction signal. The correction signal is converted into a pulse-width-modulated signal by the pulse width modulator 42*c*, amplified by one of the amplifiers of the amplifier array 44, and sent to the corresponding actuator to be controlled in the vehicle subsystem 50 via the vehicle subsystem interface 46. If the control loop is closed within the vehicle subsystem itself, the commanded reference signal issued by the supervisory computer/processor 12 will be transformed by the processor/microcontroller 42, the amplifier 44, or both so as to generate a command signal is in a format that is recognised by the vehicle subsystem being controlled.

Each component of the intelligent real time interface 40 will be described below in greater detail.

Processor/Microcontroller Block: The processor/microcontroller block 42 includes a series of microcontrollers or other similar processors 42*a* that are capable of interfacing to and controlling a defined combination of a variety of sensors and actuators, each of which is dedicated to each corresponding vehicle subsystem to be controlled or adjusted. This architecture allows the vehicle subsystems that require fast and consistent real-time sampling rates to perform at maximum performance. Each processor/microcontroller within the processor/microcontroller block 42 is responsible for reading and processing sensor information, calculating control solutions, and driving actuators so as to achieve the desired subsystem response. In addition, the processor/microcontroller 42*a* allows the implementation of advanced control and operating solutions so as to improve the performance of the associated vehicle subsystem. For instance, if the vehicle subsystem is a cruise control system, advanced control techniques can be implemented to achieve better speed tracking performance in the presence of disturbances such as those caused by hills, wind, road conditions, or the like. Furthermore, advanced control techniques can also be implemented to support an advanced cruise control strategy whereby a speed setting is maintained provided there are no obstacles in front of the vehicle. Should an obstacle appear, the speed set point is overridden by a distance set point so as to maintain a safe following distance. Once the obstacle is cleared, the speed set point becomes active once again. The processor/microcontroller is adapted to allow easy insertion or replacement thereof, for example, for the purpose of update or improvement, thereby to maximize versatility and minimise cost.

The processor/microcontroller block 42 connects to the amplifier array 44, which has one or more amplifiers dedicated to each processor/microcontroller in the block 42. It also connects to the vehicle subsystem interface 46 to read sensor data from the vehicle subsystem. One or more processors/microcontrollers in the block are dedicated to the safety/failsafe system 48.

Amplifier Array: In most control systems, control signals issued by the controller need to be amplified to operate the corresponding actuator. The dashboard system contains an amplifier array with one or more amplifiers being dedicated to a corresponding processor/microcontroller and a corresponding vehicle subsystem. The individual amplifiers provide either an analog output or a digital output (e.g. pulse width modulation (PWM)) to drive the actuator of a vehicle subsystem. The amplifier array is configured so as to allow easy insertion or replacement of amplifiers to maximize versatility and minimise cost.

Vehicle Subsystem Interface: In a vehicle, there exist a number of subsystems consisting of sensors and actuators to be controlled and/or monitored. Such systems can include the entertainment centre, lights and wipers. Many of these subsystems are monitored and controlled by the electronic control unit (ECU). The dashboard system has access to a vehicle subsystem either through a direct connection to the subsystem, through an indirect connection via the ECU, or via one of the on-board communication busses (e.g. CAN (Controller Area Network), MOST (Media Oriented Systems Transport), etc.). In the case of the latter, the subsystem components are reached through the vehicle subsystem interface. Given these options, a vehicle subsystem can be controlled by closing the control loop within the subsystem, by closing the control loop through the ECU or by closing the control loop through the haptic reconfigurable dashboard. In all cases, the haptic reconfigurable dashboard will be able to control the operation of the vehicle subsystems.

Safety/Failsafe System: In the event of a failure of one or more of the vehicle subsystems or the dashboard system itself, the safety/failsafe system contained within the intelligent real-time interface is activated. One or more processors/microcontrollers within the processor/microcontroller block is dedicated to safety/failsafe functions. The safety system continuously monitors sensor/actuator/system health in an effort to retain a safe level of operation. Should an unsafe condition be predicted or detected, the safety processor/microcontroller overrides the dashboard system, sets controls to maximise operational safety, and displays a warning message to alert the driver. The safety system is augmented with a failsafe system that ensures actuators fail in the safest manner possible.

Referring back to the dashboard system 10 of FIG. 1, the electronic control unit (ECU) is the brain of the vehicle or automobile and has access to a number of subsystems within the vehicle. The dashboard system 10 can have a module to communicate to the ECU via the ECU Interface 28, either through a direct connection or via an existing on-board communication bus such as Controller Area Network (CAN), Media Oriented Systems Transport (MOST), etc., to assess the status of automobile hardware as well as control the operation of auto hardware, if desired.

The peripheral interface 30 allows the dashboard system to connect to peripheral devices such as laptops, personal data assistants (PDA's), mechanical controls to override virtual controls in the event that the virtual controls on the device panel become inoperative due to malfunction, system analysers to troubleshoot components within the dashboard system or the vehicle, etc.

The dashboard system 10 of the invention can include a wired/wireless modem 24 for communication access to the outside world through a communications network 26 in real time or non real time as shown in FIG. 1. The wired/wireless modem can facilitate connection to the Internet, a cellular network or any other reachable wired or wireless network. For example, this connection allows the driver to download mp3 files from his home computer to listen to in his car, or to access a library of mp3 files on-line, eliminating the need for the driver to carry his music in the form of either compact disks or cassettes.

The communications network 26 provides the means for the user to connect to a remote location from the vehicle. This link allows users to download dashboard templates from a vehicle or automobile manufacturer's website, download software and firmware upgrades, download additional control intelligence, or download/upload any other information. The manufacturer can subsequently use download statistics to collect market information regarding user preferences relating to dashboard layouts, colour schemes, etc.

The audio device 14 in FIG. 1, which is driven by the supervisory computer/processor 12, is used in conjunction with the haptic device to provide information to the user regarding active virtual controls/indicators. That is, when a control/indicator is made active, the dashboard system enunciates the label associated with the active control/indicator. The audio device could also facilitate voice commands resulting in a hybrid haptic/voice-activated user interface.

A sample application will be described below, using the embodiment of the invention noted above.

Let it be assumed that an automobile manufacturer has just released a new model of a car with a haptic reconfigurable dashboard system. This dashboard system can be an LCD panel (virtual device panel) with a haptic device attached so that the driver can feel virtual buttons and knobs. This haptic device is mounted close to or on the steering column/wheel, well within the driver's vision. The haptic device may include a small "mouse", which the driver can grab on to or actuate with their thumbs/fingers, thereby allowing him or her to "feel" the virtual controls on the virtual device panel. Thus, neither the automobile manufacturer nor the end user are confined to a single dashboard layout with sundry real buttons and knobs for the lighting, environmental, stereo and wiper controls (which are spread out all over the front panel of the vehicle). Instead, different dashboard layouts can be either custom-designed by the end user or a pre-configured layout can be downloaded via the wired/wireless communication means.

Once the new owner is familiar with the haptic reconfigurable dashboard system, then he/she can virtually change the functionality of the entire automobile dashboard. For example, perhaps, when one purchases a vehicle, a factory "skin" or look/functionality of the dashboard is preinstalled. When the car starts, the owner sees five large virtual buttons: "Environmental", "Entertainment", "Wipers", "Lights", "Reprogram". The owner grabs the mouse and moves it to one of the virtual buttons. The owner can actually feel the button even though it appears to be simply a picture of a button on a display. What's more, the owner finds that he or she can turn virtual knobs and push virtual slider controls as if they are real. Optionally, the owner can enable an audio device so that in addition to feeling the active control, the haptic reconfigurable dashboard system can also tell him or her which control is active. Now suppose that the owner presses the "Entertainment" button. A new panel layout geared towards the control of his or her vehicle's entertainment center appears. Virtual sliders, pushbuttons and rotary dials are now available in the blink of an eye that allows the owner to control volume, the tuner, the balance, the equalizer, etc. Once again, these controls appear to be mere images on the virtual device panel but a quick scan over the panel with the haptic device makes the owner realize that each and every control feels like its mechanical counterpart (the more traditional knob or button).

Now, suppose that a user does not like the "look" of the panel. He hits the "Reprogram" button on the main menu and creates his own design from scratch or downloads another design from the car manufacturer's website's on-line library since the haptic reconfigurable dashboard system can connect to the Internet. On the other hand, his wife complains there are too many controls. She finds that she only ever uses a few of the buttons on each menu item. Thus, she configures the dashboard so that there are only 6 buttons (Heat on full, Lights on, Wipers on full, Volume Control, Radio and CD player) on her virtual device panel. She saves her layout in on-board memory so that she can easily load it the next time she drives the car. Also, being the user with the highest access priority to the haptic reconfigurable dashboard system, she limits the volume of the radio to 95 dB so that her teenage son doesn't damage his hearing when he uses the stereo in the car.

All the while, the manufacturer notes which on-line dashboard configuration is the most popular by analyzing download statistics so that they can target new dashboard layouts. Moreover, the communication network allows them to provide software and firmware updates for the haptic reconfigurable dashboard system. For example, suppose that the manufacturer finds that the wiper settings were not optimal and that the majority of users were adopting other settings. Through the communication network, the manufacturer automatically downloads firmware/software updates to the car, which subsequently automatically updates the processor/microcontroller in the intelligent real-time interface. From the manufacturer's standpoint, they have realized substantial savings due to the removal of failure-prone mechanical devices. Meanwhile the user has greater freedom to change the layout of the dashboard and the feel of the controls to suit his/her preference.

The advantages and benefits of the present invention include the following:

The haptic reconfigurable dashboard system of the invention readily integrates into the drive-by-wire concept;

The layout of the dashboard system can be selected by the user according to his or her preference. As well, a user is able to download their dashboard preference prior to driving an unfamiliar vehicle, whether it be a new car or a rental;

The user can eliminate controls that are often not used to reduce clutter. Reduction of dashboard clutter will also result in safer operation of the vehicle;

The user can set the size and feel of each control independently;

A number of mechanical systems, which are prone to failure, can be removed thereby reducing cost, increasing reliability and increasing safety;

The user can receive updates from the manufacturer through the communication network;

The manufacturer can readily add functionality to the dashboard system through firmware and software upgrades;

The manufacturer has enhanced customer relationship management capabilities;

By analysing download statistics, the manufacturer can define the most popular user options thereby increasing customer satisfaction;

Each driver can save their dashboard preference and load it when they use the automobile;

The haptic reconfigurable dashboard system can be augmented with audio feedback to help the user locate controls;

Since the haptic reconfigurable dashboard system is processor-based, intelligent control and operating solutions can easily be embedded;

A master user can restrict or control other users' access to subsystem functionality; and Given embedded engine/subsystem health monitoring functionality, verbose descriptions of potential problems associated with automotive subsystems can be displayed to the user. This effectively replaces the "Service Engine Soon" indicator on the instrument panel.

The haptic reconfigurable dashboard system is less of a paradigm shift for the user than a menu controlled or voice activated system.

The haptic reconfigurable dashboard system is more robust than a voice controlled system and requires very little training.

Other Applications

Even though the descriptions contained herein relate to a haptic reconfigurable dashboard, there are a number of other uses of this technology, in whole or in part, including but not limited to personal data assistants (PDA's), home appliances, industrial automation, reconfigurable gamepad, or any other human-machine interface (HMI).

While the present invention has been described with reference to several specific embodiments, the description is illustrative of the invention and is not to be construed as limiting the invention. Various modifications may occur to those skilled in the art without departing from the scope of the invention as defined by the appended claims.

What is claimed is:

1. A haptic reconfigurable dashboard system for controlling and monitoring one or more subsystems in a vehicle, said reconfigurable dashboard system comprising:
   (a) a computer for controlling said haptic reconfigurable dashboard system;
   (b) a virtual device panel for displaying a virtual control device or indicator, said virtual control device or indicator corresponding to one of said subsystems to be controlled or monitored;
   (c) a haptic device for manipulating said virtual control device or indicator displayed on the virtual device panel; and
   (d) a haptic feedback mechanism for providing a force effect to said haptic device when it manipulates said virtual control device or indicator; whereby, in response to virtual controls carried out in said dashboard system, said subsystems can be controlled or monitored through an interface between said dashboard system and said subsystems, and whereby a user can feel a sense of touching or force through said haptic device while controlling or monitoring the subsystems of the vehicle.

2. A haptic reconfigurable dashboard system according to claim 1, further comprising a virtual control devices/indicators library for containing and providing required virtual control devices or indicators to said virtual device panel.

3. A haptic reconfigurable dashboard system according to claim 2, wherein said virtual control panel is adapted to set up a lay-out of said virtual control device or indicator, store the set-up lay-out in said virtual devices/indicators library, and load said stored lay-out from said virtual devices/indicators library.

4. A haptic reconfigurable dashboard system according to claim 2, wherein said virtual control devices/indicators library can be updated via a wired or wireless communication network.

5. A haptic reconfigurable dashboard system according to claim 2, wherein said virtual control devices/indicators library is incorporated into said computer.

6. A haptic reconfigurable dashboard system according to claim 1, wherein said virtual control device on the virtual device panel defines an effect region wherein said haptic device is active inside the effect region.

7. A haptic reconfigurable dashboard system according to claim 6, wherein a gravity well effect is executed in such a manner that said haptic device is driven to the center of said effect region when inside or near the effect region.

8. A haptic reconfigurable dashboard system according to claim 1, wherein said haptic device is integrated into said virtual device panel.

9. A haptic reconfigurable dashboard system according to claim 1, wherein said haptic device is externally disposed on said virtual device panel through a lever mechanism.

10. A haptic reconfigurable dashboard system according to claim 1, wherein said haptic device is remotely disposed from said virtual device panel, and a pointer is provided on the virtual display panel, the position of said pointer corresponding to the position of said haptic device.

11. A haptic reconfigurable dashboard system according to claim 10, wherein said remotely disposed haptic device is a thumb-actuated device which is installed on a steering wheel of said vehicle.

12. A haptic reconfigurable dashboard system according to claim 10, wherein an additional haptic device is remotely disposed from said virtual device panel.

13. A haptic reconfigurable dashboard system according to claim 12, wherein said haptic devices are thumb-actuated devices which are installed on a steering wheel.

14. A haptic reconfigurable dashboard system according to claim 1, further comprising a wired or wireless modem for communicating through a communication network.

15. A haptic reconfigurable dashboard system according to claim 14, wherein software in the dashboard system can be downloaded or updated through said wired or wireless modem.

16. A haptic reconfigurable dashboard system according to claim 1, further comprising a peripheral interface for connecting a further device which is capable of overriding said virtual control when required.

17. A haptic reconfigurable dashboard system according to claim 16, wherein said further device includes a personnel data assistant, a personal computer, or a mechanical control device.

18. A haptic reconfigurable dashboard system according to claim 1, wherein the computer includes a microcontroller, a microprocessor, a digital signal processor, or an application specific integrated circuit (ASIC).

19. A haptic reconfigurable dashboard system according to claim 1, wherein the haptic device has one or more degrees of freedom in movement and actuation.

20. A haptic reconfigurable dashboard system according to claim 19, wherein the haptic device has three independent degrees-of-freedom in translational movement and three independent degrees-of-freedom in rotational movement.

21. A haptic reconfigurable dashboard system according to claim 1, further comprising an audio device for providing an aural communication between said dashboard system and a user.

22. A haptic reconfigurable dashboard system according to claim 21, wherein said aural communication includes a voice instruction for manipulating said virtual control device or indicator.

23. A haptic reconfigurable dashboard system according to claim 1, further comprising an electronic control unit (ECU) interface between said dashboard system and an ECU in a vehicle, wherein said dashboard system is capable of controlling or monitoring a vehicle subsystem via said ECU interface when required.

24. A haptic vehicle control system for controlling one or more automobile hardware devices in a vehicle, said vehicle control system comprising:
   (a) a computer for supervising said haptic vehicle control system;
   (b) a haptic reconfigurable dashboard system including;
      (i) a virtual device panel for displaying a virtual control device or indicator, said virtual control device or indicator corresponding to one of automobile hardware devices to be controlled or monitored;
      (ii) a haptic device for manipulating said virtual control device or indicator displayed on the virtual device panel; and
      (iii) a haptic feedback mechanism for providing a force effect to said haptic device when it manipulates said virtual control device or indicator;
   (c) a real-time interface between said dashboard system and said automobile hardware devices, whereby said automobile hardware devices being controlled or monitored through said real-time interface in response to virtual controls carried out in said dashboard system, and
   whereby a user can feel a sense of touching or force through said haptic device while controlling or monitoring the automobile hardware device.

25. A haptic vehicle control system according to claim 24, wherein said real-time interface has intelligence and is adapted to upgrade the intelligence.

26. A haptic vehicle control system according to claim 24, wherein said real-time interface comprises:
   (i) a microprocessor for processing virtual control signals from said haptic reconfigurable dashboard system and status or response signals from said automobile hardware device; and
   (ii) an interface between said microprocessor and said automobile hardware device, wherein the processed control signal is transmitted via the interface to drive the automobile hardware device.

27. A haptic vehicle control system according to claim 26, wherein said real-time interface further comprises an amplifier array for amplifying said virtual control signals.

28. A haptic vehicle control system according to claim 26, wherein said real-time interface further comprises a safety/failsafe system for monitoring the safe operation of said haptic vehicle control system.

29. A haptic vehicle control system according to claim 26, wherein said microprocessor includes a plurality of microcontrollers, each microcontroller corresponding to each respective automobile hardware device to be controlled or monitored.

30. A haptic vehicle control system according to claim 29, wherein said microprocessor is configured so as to allow easy insertion or replacement of each individual microcontroller.

31. A haptic vehicle control system according to claim 26, wherein a control loop for controlling the automobile hardware is closed on said microprocessor, within an electronic control unit (ECU) in a vehicle, or within the automobile hardware device itself.

32. A haptic vehicle control system according to claim 24, further comprising a wired or wireless modem for communicating through a communication network.

33. A haptic vehicle control system according to claim 32, wherein software in the vehicle control system can be downloaded or updated through said wired or wireless modem.

34. A haptic vehicle control system according to claim 24, further comprising a peripheral interface for connecting to said vehicle control system a further device for overriding said virtual controls when required.

35. A haptic vehicle control system according to claim 34, wherein said further device includes a personnel data assistant, a personal computer, or a mechanical control device.

36. A haptic vehicle control system according to claim 24, wherein the computer includes a microcontroller, a microprocessor, a digital signal processor, or an application specific integrated circuit (ASIC).

37. A haptic vehicle control system according to claim 24, further comprising an audio device for providing an aural communication between said vehicle control system and a user.

38. A haptic vehicle control system according to claim 37, wherein said aural communication includes a voice instruction for manipulating said vehicle control system.

39. A haptic vehicle control system according to claim 24, further comprising an electronic control unit (ECU) interface between said vehicle control system and an ECU in a vehicle wherein said vehicle control system can control or monitor an automobile hardware device via said ECU interface when required.

40. A haptic vehicle control device according to claim 26, wherein said microprocessor generates a correction signal based on a difference between said virtual control signal and said status or response signal to correct a control of said automobile hardware device.

41. A haptic vehicle control system of claim 24, further comprising a virtual control devices/indicators library for storing information on said virtual control device or indicator, which is capable to be updated and is provided to said virtual device panel.

* * * * *